United States Patent
Yamamoto

(10) Patent No.: US 6,702,211 B2
(45) Date of Patent: Mar. 9, 2004

(54) METHOD AND APPARATUS FOR PEELING A COATING FILM OF A COATED RESIN PRODUCT

(75) Inventor: Hiroshi Yamamoto, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/217,952

(22) Filed: Aug. 12, 2002

(65) Prior Publication Data

US 2003/0015613 A1 Jan. 23, 2003

Related U.S. Application Data

(62) Division of application No. 09/754,110, filed on Jan. 5, 2001.

(30) Foreign Application Priority Data

Jan. 18, 2000 (JP) .................................... P. 2000-009520

(51) Int. Cl.[7] .............................................. B02C 19/12
(52) U.S. Cl. ...................................... 241/65; 241/260.1
(58) Field of Search ............................ 241/69, 260.1, 241/30, 73, 65

(56) References Cited

U.S. PATENT DOCUMENTS

| | | |
|---|---|---|
| 3,536,680 A | 10/1970 | Illing |
| 3,749,322 A | 7/1973 | Reynolds |
| 5,542,982 A | 8/1996 | Terada et al. |
| 5,566,888 A | 10/1996 | Yamamoto |
| 5,566,889 A | 10/1996 | Preiss |
| 5,567,245 A | 10/1996 | Watson |
| 5,609,256 A | 3/1997 | Mankosa |
| 6,138,929 A | * 10/2000 | Montgomery ................ 241/20 |

FOREIGN PATENT DOCUMENTS

| | | |
|---|---|---|
| DE | 297 23 087 | 5/1998 |
| GB | 779364 | 7/1957 |
| GB | 865933 | 4/1961 |
| JP | 05-237410 | 9/1993 |
| JP | 5-337941 | 12/1993 |
| JP | 07-156149 | 6/1995 |
| JP | 07-256640 | 10/1995 |
| JP | 07-276364 | 10/1995 |
| WO | WO 86/06325 | 11/1986 |

OTHER PUBLICATIONS

Eurpoean Search Report, dated Sep. 28, 2001, for European Application No. EP 01100268.0, 7 pps.
Partial European Search Report, dated May 10, 2001, for European Application No. EP 01100268.0, 5 pps.

* cited by examiner

*Primary Examiner*—Mark Rosenbaum
(74) *Attorney, Agent, or Firm*—Smith, Gambrell & Russell, LLP

(57) ABSTRACT

A coating film peeling apparatus 1 comprises: a cylinder unit 10 having a loading mouth 12 on one end side and an outlet 13 on the other end side; a rotary member 20 rotatably inserted into the cylinder 11 of the cylinder unit 10 and having a protrusion 21 on its outer circumference; and a drive unit 30 for driving the rotary member 20 rotationally. The coating films are peeled from the base resin material of the coarsely crushed products 50 by loading either the coarsely crushed products 50 or the coarsely crushed products 50 and an abrasive in the cylinder 11 from the loading mouth 12 and by conveying the loaded products in the cylinder 11 while rubbing the same by the rotation of the rotary member 20.

25 Claims, 10 Drawing Sheets

METHOD AND APPARATUS FOR PEELING A COATING FILM OF A COATED RESIN PRODUCT

This application is a division of U.S. application Ser. No. 09/754,110, filed Jan. 5, 2001.

BACKGROUND OF THE INVENTION

1. Field of the Invention

The present invention relates to a coating film peeling method and a coating film peeling apparatus of a coated resin product for peeling a coating film from the coated resin product having the coating film on the surface of a base resin material.

2. Description of the Related Art

A recycling of resin products has been demanded in recent years for the environmental problems or for the reclamation of resources. In the field of automobile industries, for example, there has also been noted the recycling of the in-process defectives, which are made when the resin products such as bumpers or body side moldings are manufactured, or the resin products which are separated and recovered from scrapped cars.

The resin products such as bumpers are often coated on their surfaces so as to improve the appearances and qualities. In a bumper made of a resin, for example, a base material layer 101 of a resin is generally coated on its surface with a coating layer 103 through a primary layer 102, as sectionally shown at a essential portion in FIG. 14.

The base material layer 101 is made of a mixture, which is prepared by mixing a base of a thermoplastic synthetic resin or polypropylene with ethylene-propylene rubber and a filler such as talc, and is formed into a layer having a specific gravity of 0.91 to 0.98 and a thickness t of about 2 mm to 4 mm.

The primer layer 102 is made of an adhesive layer having a specific gravity of about 1.7 and a thickness of about 10 microns so as to strengthen the bonding power of the base material layer 101 and the coating layer 103. The coating layer 103 is formed by applying a paint coating which is made of a thermoset synthetic resin such as melamine or polyurethane.

When the bumper is crushed and pelletized to obtain a reclaimed material, however, the coating film chips are included in the polypropylene resin making the base material layer 101. In the molding process using the polypropylene resin material including the coating film chips, these coating film chips will obstruct the fluidity of the molten resin to cause a defective molding in the resin product. At the same time, the coating film chips will float to the surfaces of the resin product and deteriorate the appearances of the resin product. Because of few interactions between the coating film chips and the polypropylene resin, moreover, the coating film chips will obstruct the kneading of the reclaimed resin to degrade the mechanical properties of the resin product.

When the coated resin product is to be recycled, therefore, it is essential to remove the coating films.

This coating film removing method is classified coarsely into the mechanical, physical and chemical methods. The mechanical coating film removing method is exemplified by a shot blast method and a screen mesh method. The shot blast method is for breaking and removing the coating films or deposits by blasting abrasive particles with compressed air, for example, to the coating film surface formed on the resin product. The screen mesh method is for removing the coating film chips not melted but included, by pulverizing the resin product finely and then by filtering the fine chips being heated and melted through a screen mesh.

The shot blast method removes the coating films by the frictions and impacts and is excellent in the non-toxic properties and the environmental safety. Despite of these excellences, however, the shot blast method takes a long time for the treatment but is neither sufficient in the coating film removing efficiency nor easy for the treatment of curved portions. On the other hand, the screen mesh method is also excellent in the non-toxic properties and the environmental safety because it removes the coating film chips through the filtration. When the screen mesh is clogged, however, the extrusion pressure seriously rises to reduce the extrusion and the productivity and to have an insufficient efficiency for removing the coating film chips. The screen mesh has to be replaced so as to avoid the reduction, as caused by the clogging, in the production efficiency.

The physical coating film removing method uses a halogen solvent or various organic solvents to remove the coating films by making use of the penetration of the solvent into the interface between the coating films and the base material and the swelling phenomenon of the coating films by the solvent. Therefore, the physical coating film removing method is inferior in the environmental safety for the disposal of the waste liquid and is poorer in the coating film removing efficiency and the treating capacity but may deteriorate the base material.

Since these mechanical and physical coating film removing methods are poor in the coating film removing efficiency, the resin product using the resin material reclaimed by those methods is high in the production cost so that its application is seriously restricted.

The chemical coating film removing method is exemplified by the organic salt method for decomposing and removing the coating film chemically by cutting the ether bonds in the vicinity of the bridges of the coating film resin with an aqueous solution of ethanol containing an organic salt.

This method has a problem in the secondary treatment such as the wastewater treatment and has a poor treating capacity so that it is not preferable for the treating efficiency.

As disclosed in Japanese Patent Unexamined Publication No. 5-337941, on the other hand, there has been proposed a synthetic resin surface peeling apparatus for cutting and peeling the coating films by applying the cutting force and the frictional force to the coating films by a pair of rotary members.

In this peeling apparatus, as schematically shown in a front elevation in FIG. 12 and in a sectional view of line I—I of FIG. 12 in FIG. 13, a resin product such as a body side molding 122 is transferred between rollers 123 and 124 made of a foamed synthetic resin by a pair of conveyor rollers 121. By setting the transfer velocity V of the body side molding 122 lower than the circumferential velocity of the rollers 123 and 124, high cutting and frictional forces are applied to the coating film 122a and the double adhesive tape 122b of the body side molding 122 to cut and peel the coating film 122a and the double adhesive tape 122b from the surface of the body side molding 122. By the paired conveyor rollers 121, moreover, the body side molding 122 is discharged to the outside.

In this apparatus, the resin product is brought into contact with the rotating rollers 123 and 124 made of the foamed synthetic resin. Therefore, the rollers 123 and 124 will have brittle fracture to generate dust unfavorably for the working environment. On the other hand, the apparatus is not suited for peeling the coating films from bent or curved resin products.

SUMMARY OF THE INVENTION

In view of the points thus far described, therefore, a first object of the invention is to provide a coating film peeling method for a coated resin product, which is excellent in the coating film removing efficiency, the environmental safety and the treating capacity to produce recycled resin products of a high quality.

Moreover, a second object of the invention is to provide a coating film peeling apparatus for a coated resin product, which is constructed to execute the aforementioned coating film peeling method simply at a low cost.

In order to achieve the aforementioned first object, the invention of a method for peeling a coating film of a coated resin product comprises: coarsely crushing the coated resin product having a base resin material coated with the coating film; and conveying thus coarsely crushed products of the coated resin product while rubbing the same to peel the coating film from the base resin material.

According to the invention, by neither employing chemicals such as organic salts or solvents nor requiring a secondary treatment such as the wastewater treatment, moreover, the coated resin products can be coarsely crushed, and the coarsely crushed products are conveyed while being rubbed, to peel the coating films from the base resin material. With this small number of steps, it is possible to improve the coating film removing efficiency, the environmental safety and the treating capacity.

In the coating film peeling method for the coated resin product, it is preferable that the coarsely crushed products of the coated resin products are conveyed while being mixed with an abrasive.

According to the invention, the coarsely crushed products of the coated resin product are rubbed in additional contact with the abrasive so that the separation of the coating film from the base resin material can be promoted to enhance the coating film removing efficiency to a higher level.

In order to achieve the aforementioned second object, the invention of a coating film peeling apparatus for peeling a coating film from coarsely crushed products of a coated resin product having a base resin material coated with the coating film, comprises: a cylindrical member having a loading mouth on one end side and an outlet on the other end side; a rotary member disposed rotatably within the cylindrical member and having a protrusion on its outer circumference; and a drive unit driving the rotary member rotationally, wherein the coarsely crushed products of the coated resin product are loaded into the cylindrical member from the loading mouth and then are conveyed and rubbed by a rotation of the rotary member.

According to the invention, by neither employing chemicals such as organic salts or solvents nor requiring the secondary treatment such as the wastewater treatment, moreover, the coated resin products can be coarsely crushed, and the coarsely crushed products are conveyed while being rubbed by the cylindrical member such as a cylinder and the rotary member to peel the coating films from the base resin material, thereby to improve the coating film removing efficiency, the environmental safety and the treating capacity. Moreover, the cylinder unit, the rotary member and drive unit, for example, can be constructed by utilizing the parts of the existing extrusion molding machine, for example, so that the coating film peeling apparatus can be provided simply at the low cost.

In the coating film peeling apparatus for the coated resin product, it is preferable that the protrusion includes a helical protrusion extending helically in an axial direction of the rotary member.

According to the invention, the protrusion is the helical protrusion so that the loaded products can be reliably rubbed by one another by the turning force of the rotary member and by the extruding force of the loaded products to peel the coating film effectively from the base resin material of the coarsely crushed products.

In the coating film peeling apparatus for the coated resin product, it is also preferable that the protrusion includes a plurality of elliptical protrusions provided in parallel in an axial direction of the rotary member, each elliptical protrusion having a substantial elliptical section as viewed in the axial direction of the rotary member, and major-axes of adjoining elliptical protrusions intersecting.

According to the invention, the protrusion includes the plurality of elliptical protrusions so that the loaded products can be rubbed while being agitated, to enhance the coating film removing efficiency to a higher level.

Further, in the coating film peeling apparatus for the coated resin product, it is preferable that the protrusion includes: a helical protrusion extending helically in the axial direction; and a plurality of elliptical protrusions provided in parallel in an axial direction of the rotary member, each elliptical protrusion having a substantial elliptical section as viewed in the axial direction and major-axes of adjoining elliptical protrusions intersecting.

According to the invention, the loaded products can be rubbed by one another while being pressed, at the portion having the helical protrusion, and can be rubbed while being agitated under the reduced pressure at the portion having the plurality of elliptical protrusions, so that the coating film can be removed more efficiently.

In the last mentioned coating film peeling apparatus for the coated resin product, the helical protrusion and the elliptical protrusions are combined and arranged in plurality in the axial direction.

According to the invention, the rubbing under the pressure of the loaded products and the rubbing by the agitation under the reduced pressure are repeated so that the coating film can be removed more efficiently.

In the coating film peeling apparatus the coated resin product, the pitch of the protrusion may be set to be the smaller the more downward in a conveying direction of the loaded coarsely crushed products.

In the coating film peeling apparatus for the coated resin products, on the other hand, a diameter of the protrusion may be also set to be the larger the more downward in a conveying direction of the loaded coarsely crushed products.

According to the individual inventions, the pressure to act on the loaded products can be gradually raised to the higher level or the pressure at which the loaded products mate with each other can be prevented the more from dropping, the more downstream of their conveying direction. Therefore, the coating film peeling force by the rubbing action can always be applied to the coarsely crushed products so that the coating films can be peeled more reliably.

In the coating film peeling apparatus for the coated resin product, it is preferable that the cylindrical member includes a first cylindrical portion and a second cylindrical portion which are formed in parallel in an axial direction of the rotary member while partially overlapping each other, and the rotary member includes a first rotary member disposed rotatably within the first cylindrical portion and a second rotary member disposed rotatably within the second cylindrical portion.

According to the invention, the peeling treatment of the coating films is performed in the first cylindrical portion and the second cylindrical portion so that the treating capacity can be enhanced to a higher level. At the same time, the loaded products migrate between the first cylindrical portion and the second cylindrical portion and are rubbed while being agitated, so that the coating films can be removed more efficiently.

The coating film peeling apparatus for the coated resin product, further may comprise heating means for heating an inside of the cylindrical member.

According to the invention, the loaded products are heated in the cylindrical member so that the coating film peeling efficiency can be enhanced to a higher level.

In the coating film peeling apparatus for the coated resin product, the cylindrical member may have an opening formed between the loading mouth and the outlet on the cylindrical member, the opening provided with a mesh for dropping a part of chips of the coating film peeled from the coarsely crushed products.

According to the invention, the coating film chips, as peeled off in the cylindrical member, are partially dropped to facilitate the work to separate/fractionate the base resin material and the coating films from the discharge which is excluded from the outlet of the cylindrical member.

In the coating film peeling apparatus for coated resin products, the cylindrical member may include a plurality of cylindrical elements jointed removably to each other in an axial direction of the rotary member.

According to the invention, when the rotary member is exemplified by arranging the plurality of the portion having the helical protrusion and the portion having the plurality of elliptical protrusions in combination in the axial direction, as in the above-mentioned invention, it is possible to assemble them easily. When the cylinder is worked on its lower face, as in the above-mentioned invention, it is possible to facilitate the work.

In the coating film peeling apparatus for coated resin products, the cylindrical member has a roughened inner face.

According to the invention, the coating films are also peeled by the rubbing between the coarsely crushed products of the coated resin products and the inner face of the cylindrical member so that the removing efficiency and the treating capacity of the coating films can be more improved.

DETAILED DESCRIPTION OF THE PREFERRED EMBODIMENT

A coating film peeling method for coated resin products and a coating film peeling apparatus according to the invention will be described in connection with their embodiments with reference to the accompanying drawings.

(First Embodiment)

Figure 1:
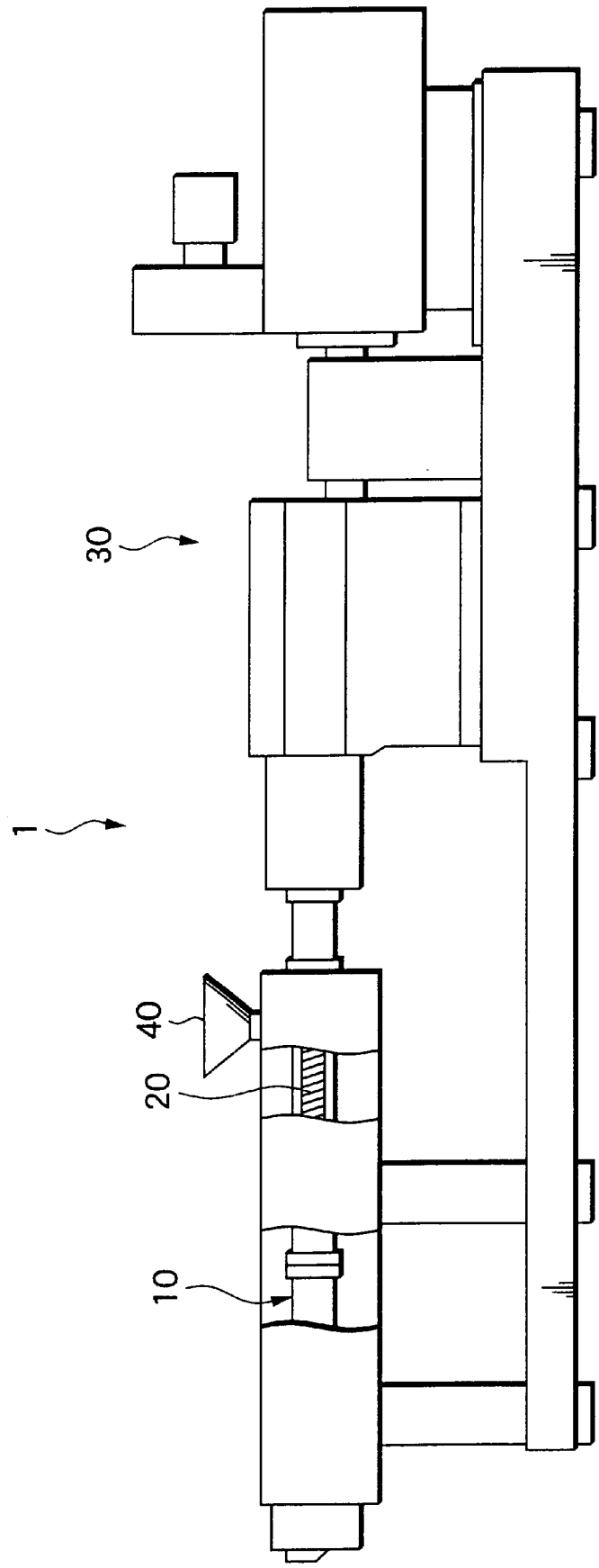
FIG. 1 is a view showing the entire construction of an apparatus for peeling a coating film of a coated resin product in a first embodiment of the invention with its portion being cut away.
Figure 2:
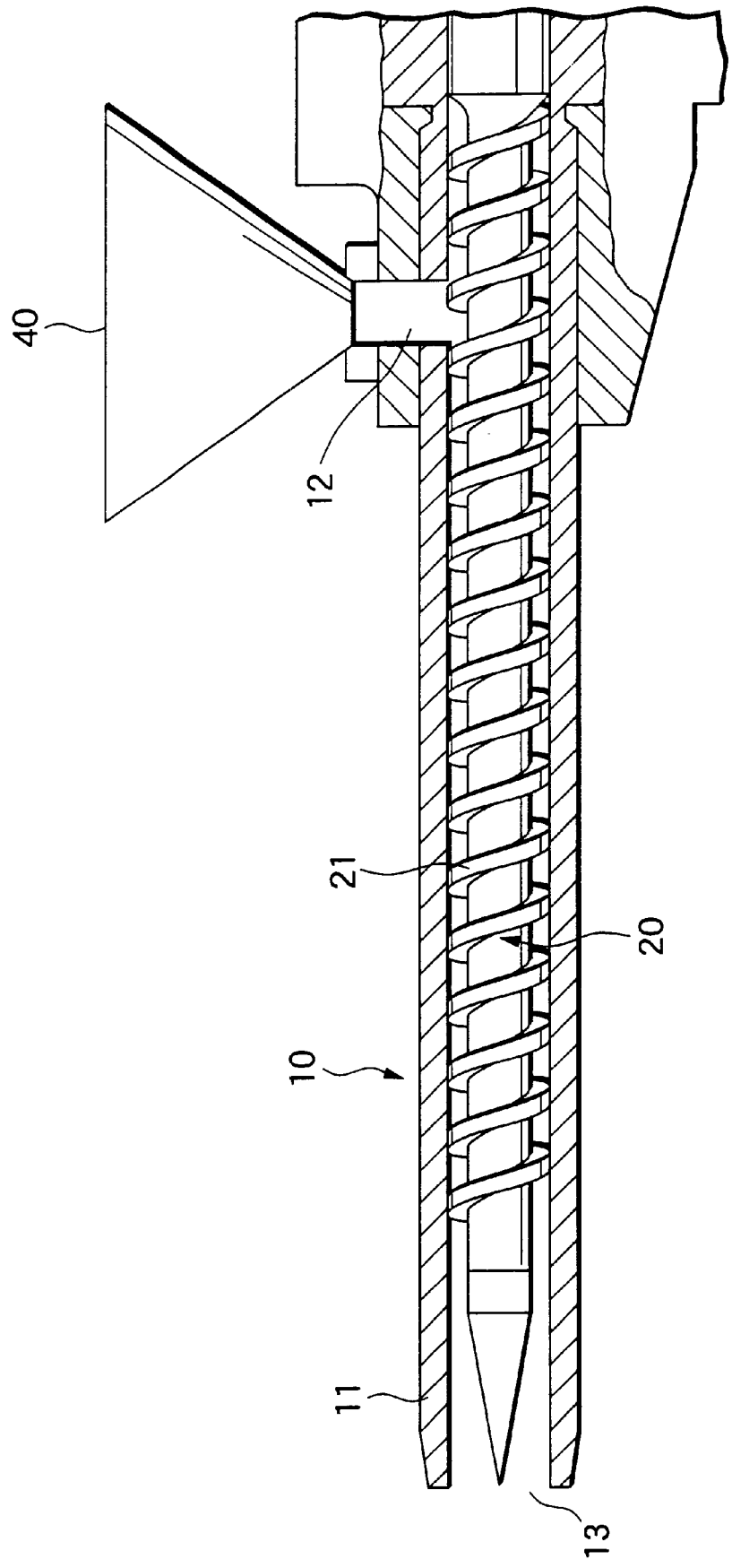
FIG. 2 is a sectional view showing the detailed construction of a cylinder unit and a rotary member shown in FIG. 1.

A first embodiment will be described with reference to FIGS. 1 to 3. FIG. 1 is a view showing the entire construction with its portion being cut away; FIG. 2 is a sectional view showing the detailed construction of a cylinder unit and a rotary member; and FIG. 3 is a view for explaining the actions.

A coating film peeling apparatus 1, as shown in FIG. 1, includes a cylinder unit 10, a rotary member 20, and a drive unit 30. The rotary member 20 is rotatably inserted into the cylinder 11 of the cylinder unit 10. The drive unit 30 drives the rotary member 20 rotationally.

The cylinder unit 10 is formed into one unit, as shown in FIG. 2, to have a loading mouth 12 and an outlet 13. The loading mouth 12 is opened in the end portion on the side of the drive unit 30, i.e., in the outer circumference of its one end portion as to communicate with the cylinder 11. A hopper 40 is jointed to the loading mouth 12. The outlet 13 is opened in the end portion of the cylinder unit 10 on the side opposed to the loading mouth 12, i.e., in the end face of the other end portion. On the other hand, the rotary member 20 is formed into one unit and provided on its outer circumference with a helical protrusion 21 which is continuously formed at an equal pitch as to extend helically in the axial direction.

Figure 3:
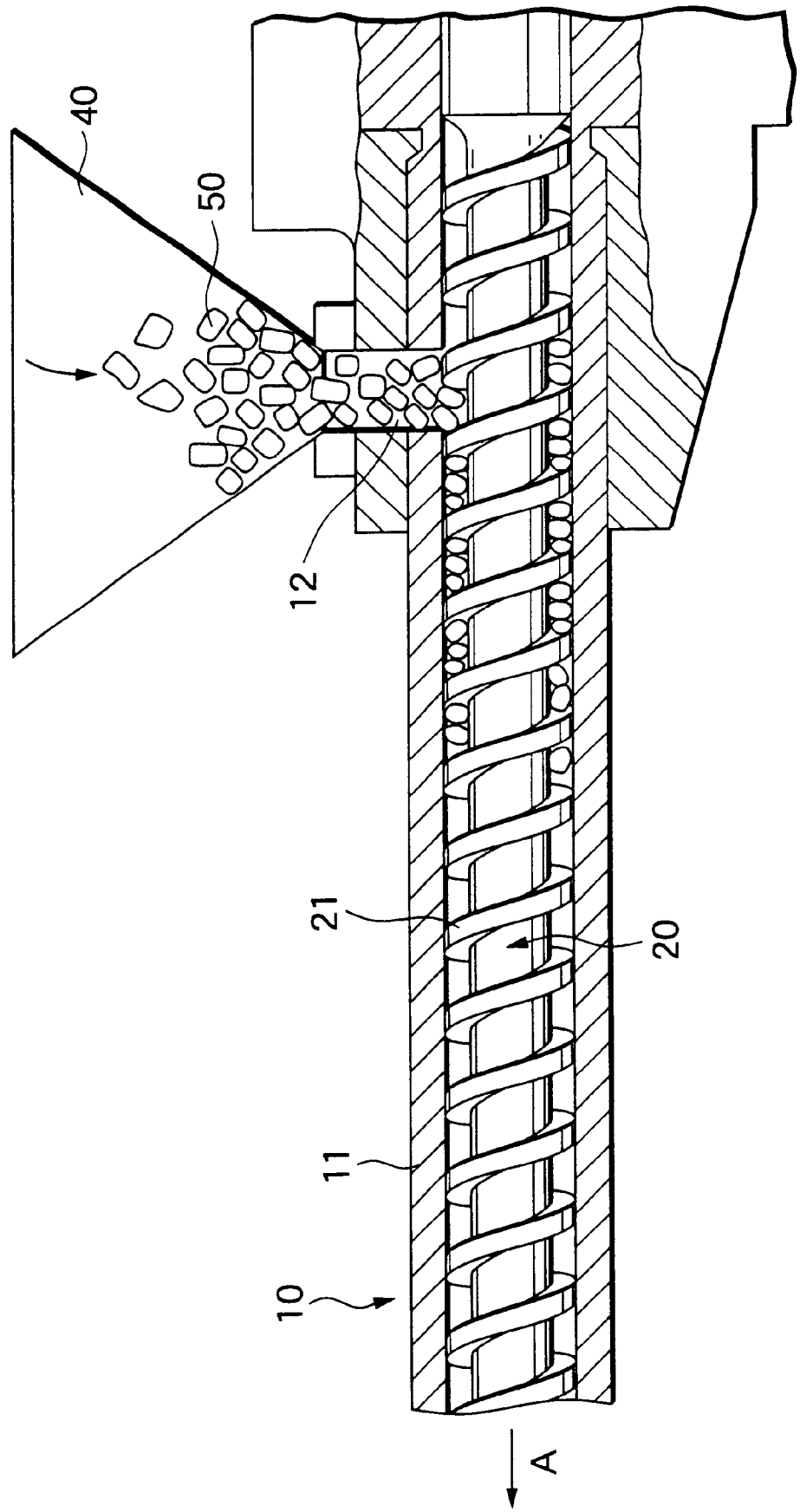
FIG. 3 is a view for explaining the actions of the first embodiment.

In this embodiment, the coated resin products such as bumpers having coating films to be peeled are coarsely size-reduced in advance, and these size-reduced products 50 are loaded in the cylinder 11, as shown in FIG. 3, from the loading mouth 12 by feeding them together with an abrasive, if necessary, directly or through the (not-shown) feeder into the hopper 40.

When the coarsely size-reduced products 50 of the coated resin products are loaded in the cylinder 11, they are fed to the clearances between the adjoining helical protrusions 21 of the rotary member 20 and the cylinder 11 so that they are conveyed in the direction of arrow A in the cylinder 11 by the rotation of the rotary member 20.

At this time, by the turning force of the rotary member 20 and by the extruding force of the coarsely crushed products 50 by the rotation of the rotary member 20, these products 50 are rubbed by one another so that they are subjected to a coating film peeling force such as a shearing force between the base resin material and the coating films. The coarsely crushed products 50 are further conveyed, while keeping the subjected state, in the direction of arrow A in the cylinder 11 so that the coating films are substantially completely peeled from the base resin material of the coarsely crushed products 50 and are extruded from the outlet 13. Especially when the mixture of the coarsely crushed products 50 of the coated resin products and the abrasive is loaded in the cylinder 11, the coarsely crushed products 50 contact with the mixed abrasive and are rubbed so that the peeling of the coating films can be promoted to enhance the removing efficiency of the coating films.

Here, the coating films of the coarsely crushed products 50 are peeled into granular shapes in the cylinder 11 so that it is extruded together with the base resin material and discharged from the outlet 13. As a result, the base resin material and the coating films can be easily separated/fractionated, for example, by the difference in the specific gravity or granulation or by the electrostatic separation. By recycling the base resin material thus separated/fractionated from the coating films, therefore, it is possible to obtain recycled resin products of a high quality.

On the other hand, the cylinder unit 10, rotary member 20 and drive unit 30 thus above-described can be constructed by utilizing the parts of the existing extrusion molding machine, for example, so that the coating film peeling apparatus can be provided in its entirety simply at a low cost.

By neither employing chemicals such as organic salts or solvents nor requiring a secondary treatment such as the wastewater treatment, moreover, the coated resin products can be coarsely crushed, and the coarsely crushed products 50 are extruded and conveyed while being rubbed by the cylinder 11 and the rotary member 20 to peel the coating films from the base resin material. With this small number of steps, it is possible to improve the coating film removing efficiency, the environmental safety and the treating capacity.

(Second Embodiment)

Figure 4:
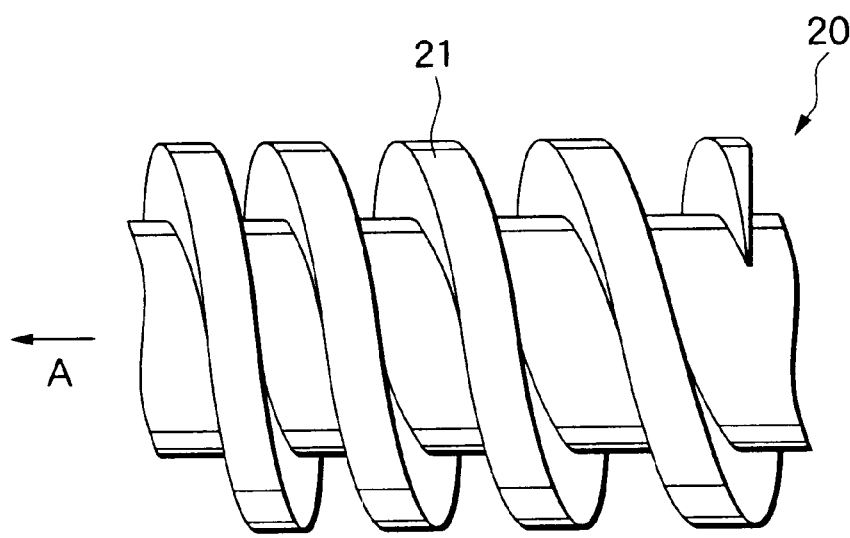
FIG. 4 is a view for explaining an essential portion of a second embodiment of the invention.

In the first embodiment, a second embodiment of the invention is characterized in that the helical protrusion 21 of the rotary member 20 is formed to have such a pitch as becomes smaller downstream of a conveying direction of the loaded products, as indicated by arrow A in FIG. 4.

According to this construction, the pitch of the helical protrusion 21 of the rotary member 20 can become the smaller the more downward of the conveying direction thereby either to make the pressure to act on the loaded products gradually higher downward of the conveying direction or to prevent the acting pressure from being lowered as the products mate with one another. As a result, the coating film peeling force by the rubbing actions can always be applied to the coarsely crushed products 50 so that the coating films can be peeled off more reliably.

(Third Embodiment)

Figure 5:
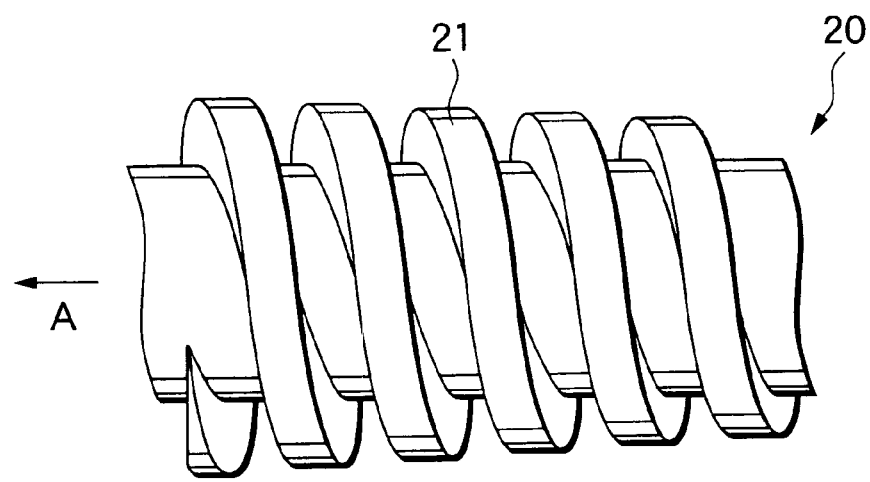
FIG. 5 is a view for explaining an essential portion of a third embodiment.

In the first embodiment, a third embodiment of the invention is characterized in that the helical protrusion 21 of the rotary member 20 is formed to have such an external diameter as becomes the greater the more downstream of the conveying direction, as indicated by arrow A in FIG. 5.

In this case, too, the clearance between the helical protrusion 21 and the cylinder 11 becomes gradually small. As a result, as in the second embodiment, it is possible either to make the pressure to act on the loaded produces gradually higher downward of the conveying direction or to prevent the acting pressure from being lowered as the products mate with one another. Therefore, the coating film peeling force by the rubbing actions can always be applied to the coarsely crushed products 50 so that the coating films can be peeled off more reliably.

(Fourth Embodiment)

Figure 6:
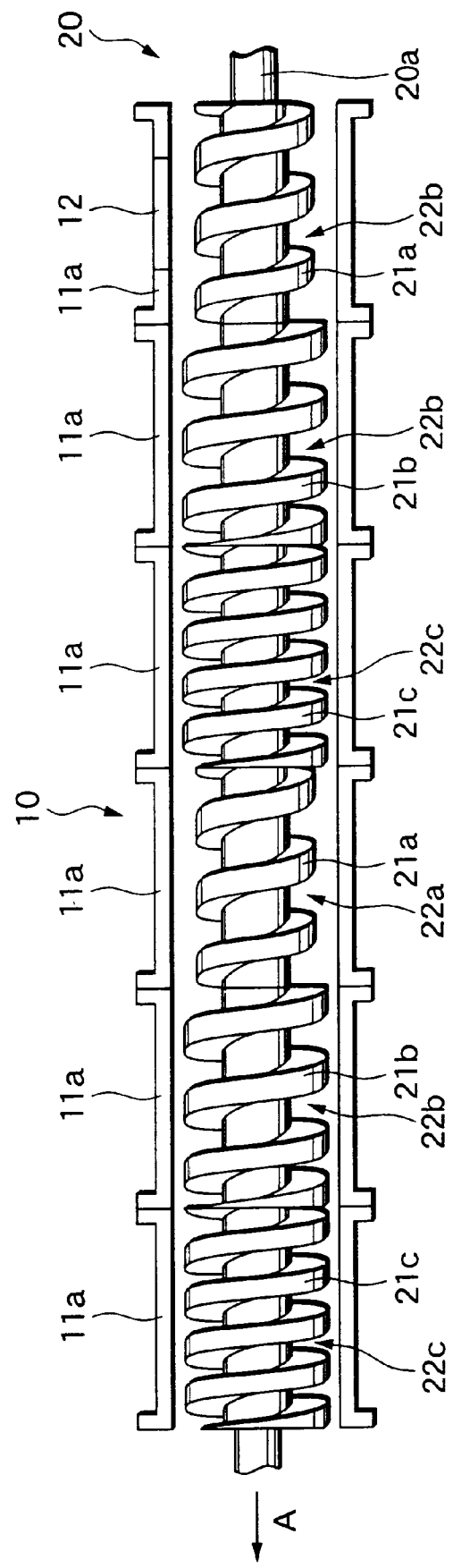
FIG. 6 is a view showing the construction of an essential portion of a fourth embodiment.

FIG. 6 shows a construction of an essential portion of a fourth embodiment. In the construction shown in FIG. 1, this embodiment is characterized in that the cylinder unit 10 includes a plurality of cylinder elements 11a which are removably jointed in the axial direction. Here, the loading mouth 12 is formed in the cylinder element 11a at the portion where the coarsely crushed products 50 of the coated resin products are loaded.

On the other hand, the rotary member 20 includes a single rotary shaft 20a and a plurality of rotary member elements jointed to the rotary shaft 20a in such a manner that the plurality of rotary member elements are disposed integrally rotatably in the axial direction of the rotary shaft 20a. In this embodiment, the rotary member 20 is constructed by jointing: a rotary member element 22a provided with a helical protrusion 21a having a smaller external diameter; a rotary member element 22b provided with a helical protrusion 21b having the same pitch as that of the helical protrusion 21a but a larger diameter than that of the helical protrusion 21a; and a rotary member element 22c provided with a helical protrusion 21c having the same external diameter as that of the helical protrusion 21b and a smaller pitch than that of the helical protrusion 21b, from the upstream to downstream sides of the conveying direction, as indicated by arrow A, sequentially and repeatedly to the rotary shaft 20a. The rotary member elements 22a, 22b and 22c are jointed removably in the axial direction.

According to this embodiment, at the portion of the rotary member element 22a provided with the helical protrusion 21a having the small external diameter, the loaded products can be rubbed by one another while being agitated. After this, at the rotary member element 22b provided with the helical protrusion 21b having the same pitch as that of the helical protrusion 21a but the larger diameter than that of the helical protrusion 21a, the loaded products can be rubbed by one another while being pressurized. At the rotary member element 22c provided with the helical protrusion 21c having the same external diameter as that of the helical protrusion 21b and the smaller pitch than that of the helical protrusion 21b, moreover, the loaded products can be rubbed by one another while further raising the pressure to act on the loaded products or while preventing the acting pressure from being lowered as loaded products mate with one another and, and these individual actions can be repeated as the loaded products are conveyed. Therefore, it is possible to remove the coating films more efficiently from the coarsely crushed products 50 of the coated resin products.

(Fifth Embodiment)

Figure 7:
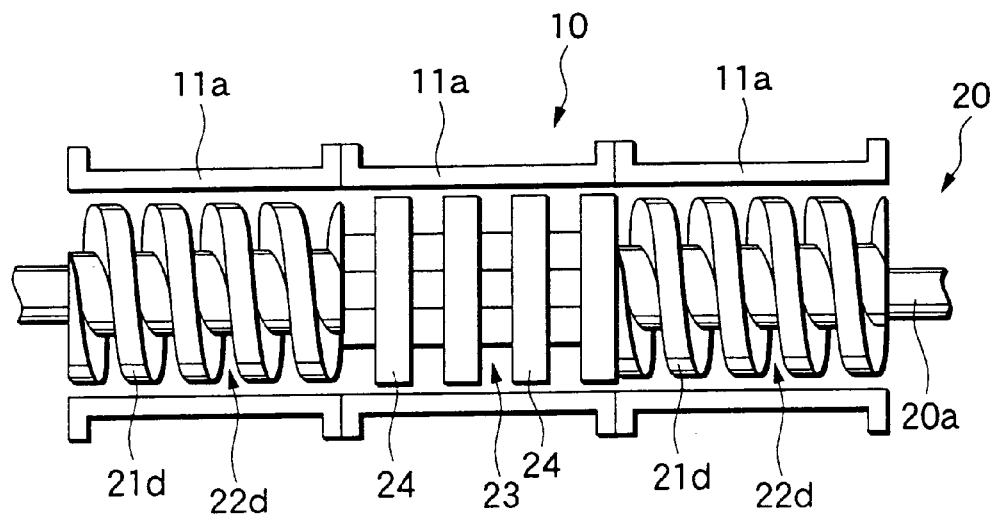
FIG. 7 is a view showing the construction of an essential portion of a fifth embodiment.
Figure 8:
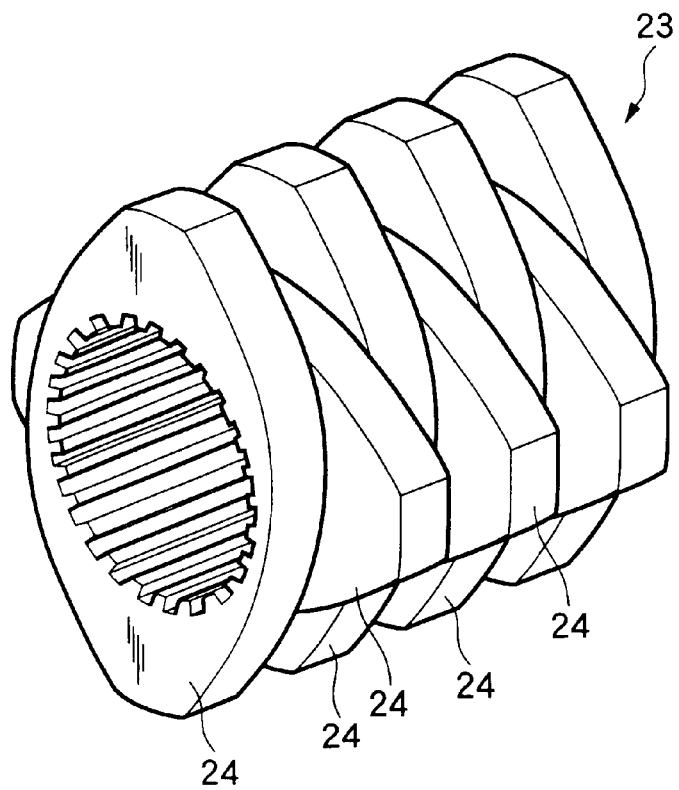
FIG. 8 is a perspective view of a portion of FIG. 7.

FIGS. 7 and 8 show a construction of an essential portion of a fifth embodiment of the invention. In the fourth embodiment, according to the fifth embodiment, the rotary member 20 is constructed by arranging a rotary member element 22d provided with a helical protrusion 21d and a rotary member element 23 provided with a protrusion having a shape different from that of the helical protrusion, on the rotary shaft 20a such that the rotary member element 23 is suitable between ones of the plurality of rotary member elements 22d. The rotary member elements 22d and 23 are jointed removably in the axial direction.

The rotary member element 23 is constructed, as shown in a perspective view in FIG. 8, such that a plurality of elliptical protrusions 24 having a generally elliptical contour are arranged in parallel in the axial direction and such that the major-axes of the axially adjoining elliptical protrusions 24 intersect at a right angle in this embodiment.

With this construction, at the portions of the rotary member elements 22d provided with the helical protrusion 21, the loaded products can be rubbed by one another while being pressed. At the portion of the rotary member element 23 provided with the plurality of elliptical protrusions, the loaded products can be rubbed by one another while being agitated. Therefore, the coating films can be removed highly efficiently from the coarsely crushed products 50 of the coated resin products.

(Sixth Embodiment)

Figure 9:
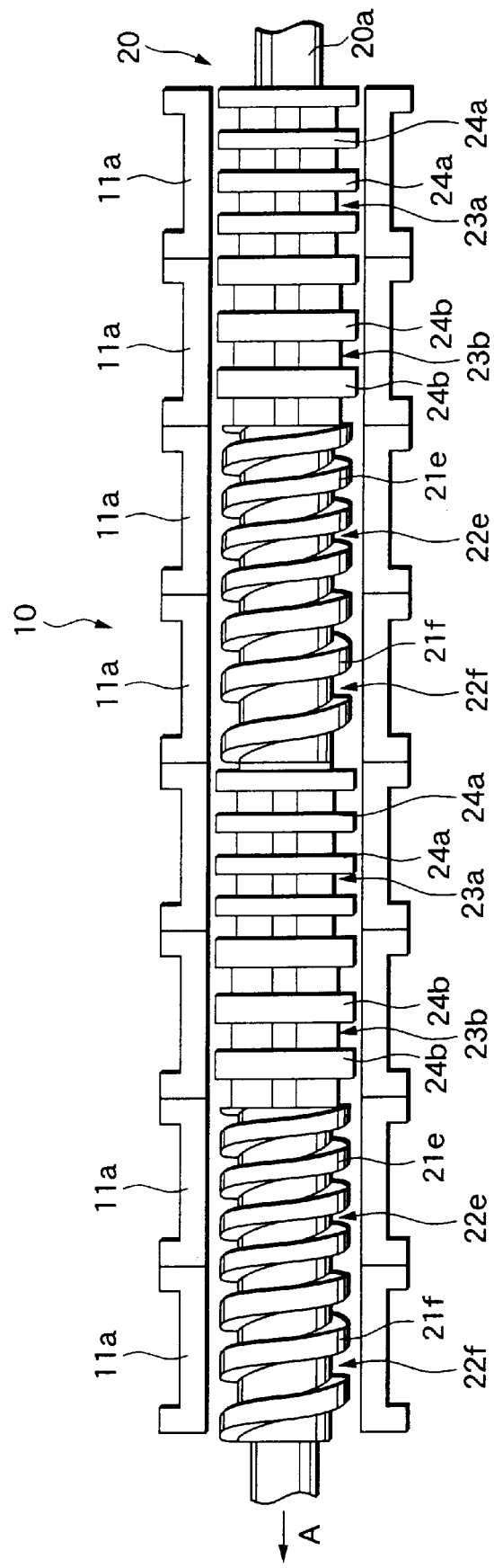
FIG. 9 is a view showing the construction of an essential portion of a sixth embodiment of the invention.

FIG. 9 shows a construction of an essential portion of a sixth embodiment of the invention. In this embodiment, the cylinder unit 10 includes the plurality of cylinder elements 11a jointed removably in the axial direction, and the rotary member 20 is constructed by combining the plurality of rotary member elements providing with helical protrusions having different shapes, and the plurality of rotary member elements provided with elliptical protrusions having different shapes.

Here, the rotary member 20 is constructed by jointing: a rotary member element 23a provided with a plurality of elliptical protrusions 24a having a smaller width and a smaller minor-axis length; a rotary member element 23b provided with a plurality of elliptical protrusions 24b having a larger width and a larger minor-axis length than those of the rotary member element 23a; a rotary member element 22e provided with a helical protrusion 21e having a small width and a small pitch; and a rotary member element 22f provided with a helical protrusion 21f having a larger width and a larger pitch than those of the rotary member element 22e, from the upstream to downstream sides of the conveying direction, as indicated by arrow A, sequentially and repeatedly to the rotary shaft 20a. The rotary member elements 23a, 23b, 22e and 22f are jointed removably in the axial direction.

According to this embodiment, therefore, at the portions of the rotary member elements 23a and 23b, the loaded products are rubbed by one another while being agitated under different pressures. At the portions of the rotary member elements 22e and 22f, the loaded products are rubbed by one another under different pressures. These actions are repeated as the loaded products are conveyed, so that the coating films can be removed highly efficiently from the coarsely crushed products 50 of the coated resin products.

(Seventh Embodiment)

Figure 10:
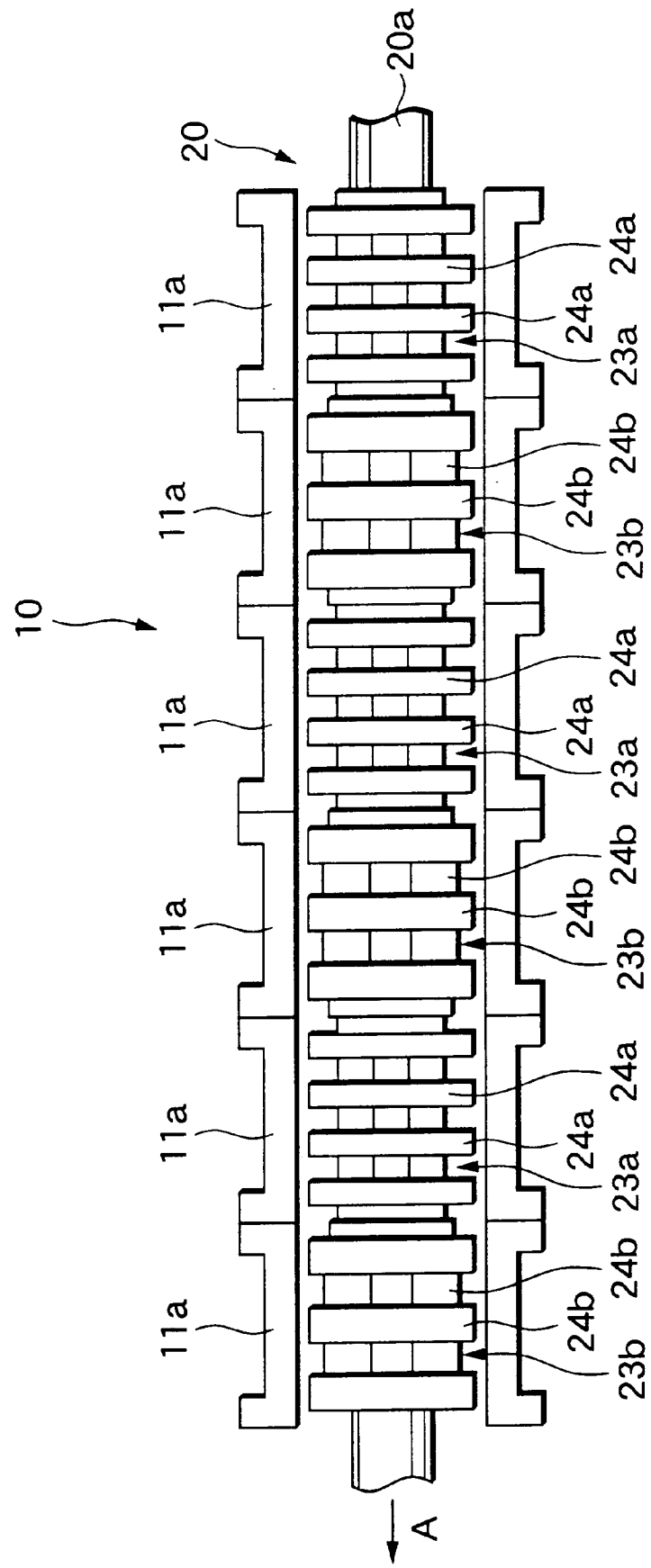
FIG. 10 is a view showing the construction of an essential portion of a seventh embodiment.

FIG. 10 shows a construction of an essential portion of a seventh embodiment of the invention. In the sixth embodiment, according to the seventh embodiment, the rotary member 20 is constructed by jointing the rotary member elements provided with two kinds of elliptical protrusions: a rotary member element 23a provided with a plurality of elliptical protrusions 24a having a small width and a small minor-axis length; and a rotary member element 23b provided with a plurality of elliptical protrusions 24b having a larger width and a larger minor-axis length than those of the rotary member element 23a, from the upstream to downstream sides of the conveying direction, as indicated by arrow A, sequentially and repeatedly to the rotary shaft 20a. The rotary member elements 23a and 23b are jointed removably in the axial direction.

In this case, too, the loaded products are rubbed by one another at the portions of the rotary member elements 23a and 23b while being agitated under different pressures so that the coating film scan be removed highly efficiently from the coarsely crushed products 50 of the coated resin products.

(Eighth Embodiment)

Figure 11:
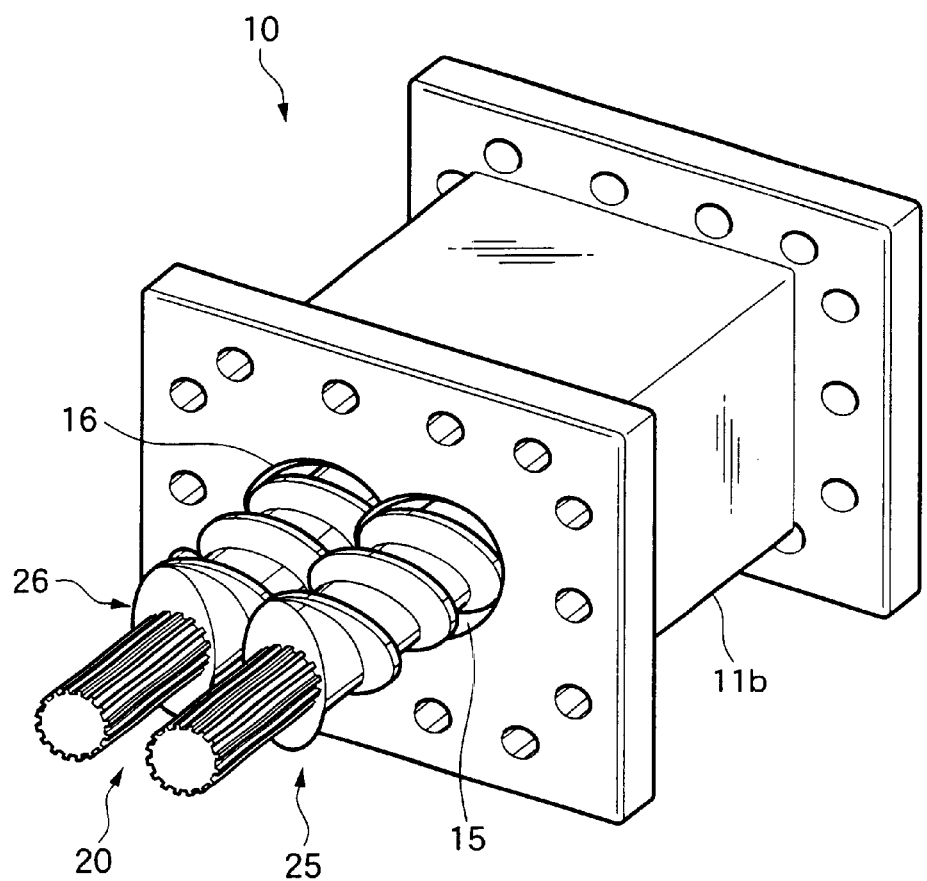
FIG. 11 is a view showing the construction of an essential portion of an eighth embodiment.
Figure 12:
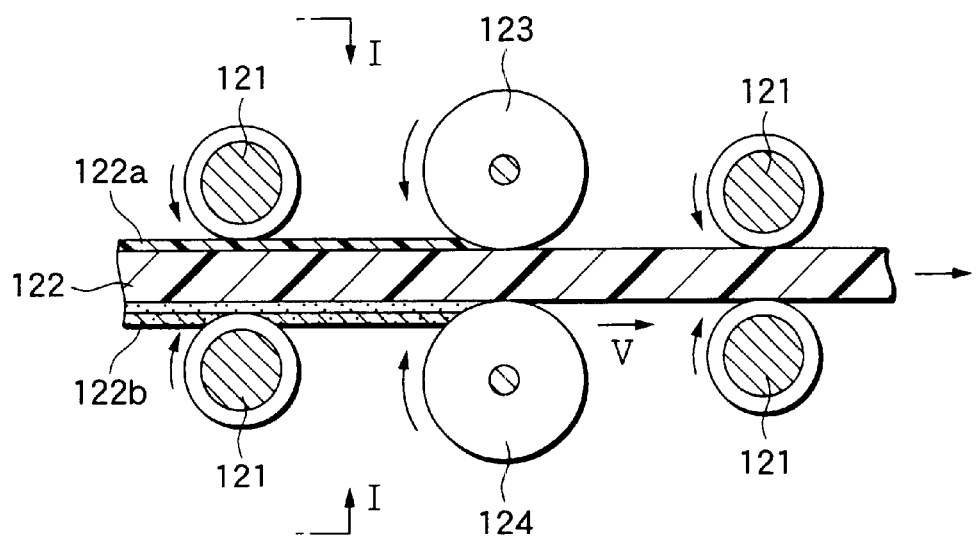
FIG. 12 is a front elevation showing a peeling apparatus of the related art.
Figure 13:
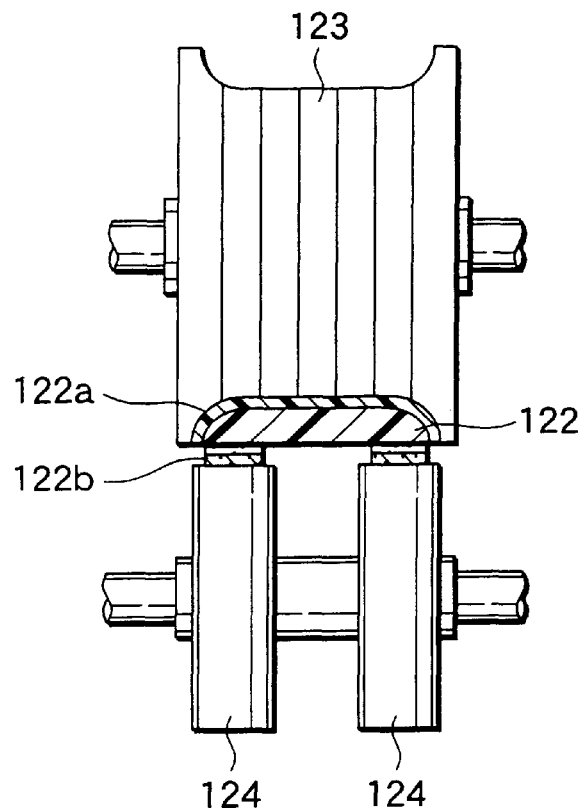
FIG. 13 is a sectional view of line I—I of FIG. 12.
Figure 14:
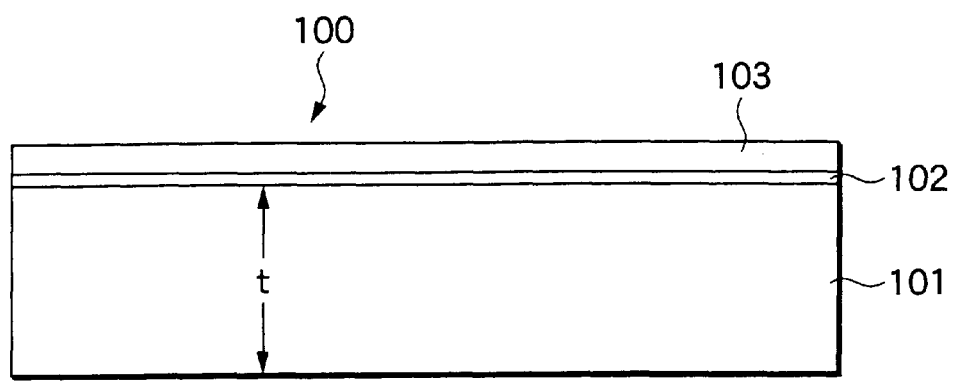
FIG. 14 is a sectional view of an essential portion of a bumper made of a resin.

FIG. 11 is a perspective view showing a construction of an essential portion of an eighth embodiment of the invention. In this embodiment, the cylinder unit 10, as shown in FIG. 1, is constructed to include a plurality of cylinder elements 11b which are jointed removably in the axial direction, and each cylinder element 11b is provided with a first cylinder 15 and a second cylinder 16 which are arranged in parallel while being partially overlapping each other.

On the other hand, the rotary member 20 is constructed such that a first rotary member 25 and a second rotary member 26 are rotatably inserted into the first cylinder 15 and the second cylinder 16, respectively, and are rotationally driven in a common direction by the drive unit 30. Here, the first rotary member 25 and the second rotary member 26 are provided with the helical protrusions or the elliptical protrusions, as have been described in the foregoing embodiments.

According to this embodiment, the coating film peeling treatments are performed individually in the first cylinder 15 and the second cylinder 16 so that the treating capacity can be enhanced to a higher level. At the same time, the loaded products migrate between the first cylinder 15 and the second cylinder 16 and are rubbed by one another while being agitated, so that the coating films can be removed highly efficiently.

The invention should not be limited to the foregoing embodiments but could be modified in various manners without departing from the gist thereof. Where the rotary member is provided with the helical protrusion, for example, this helical protrusion should not be limited to one but could be exemplified by a plurality. Where the rotary member is provided with a plurality of elliptical protrusions, the sequential major-axis directions of the elliptical protrusions should not be limited to 90 degrees but could be exemplified by an arbitrary angle such as 60 degrees. Moreover, the protrusions of the rotary member could be provided with only a plurality of elliptical protrusions having common size, width and so on. Moreover, the combination of the rotary member elements having the different helical protrusions, the combination of the rotary member elements having different elliptical protrusions, and their combinations could also be exemplified by others than those of the foregoing embodiments.

On the other hand, the coating film removing efficiency and treating capacity can be improved to higher levels by forming the cylinder to have a roughened inner face so that the coarsely crushed products of the coated resin products may also be rubbed by the inner face of the cylinder to peel off the coating films.

On the other hand, the adhesion of the coating films of the coated resin products depends highly on the temperature. Therefore, the peeling efficiency of the coating films can be enhanced to a higher level by providing the cylinder unit with heating means to heat the inside of the cylinder to 40° C. to 80° C., for example.

On the other hand, an opening is formed in the lower face of the cylinder and is provided with a mesh so that the coating film granular chips, as peeled from the coarsely crushed products, could also drop partially through the mesh. Thus, the coating film chips, as contained in the discharge extruded from the outlet of the cylinder unit, can be reduced to make it easier to separate/fractionate the base resin material and the coating films from the discharge.

According to the method of the invention for peeling the coating films of the coated resin products, by neither employing chemicals such as organic salts or solvents nor requiring a secondary treatment such as the wastewater treatment, the coated resin products are coarsely crushed, and the coarsely crushed products are conveyed while being rubbed, to peel the coating films from the base resin material. With this small number of steps, the method of the invention is excellent in the coating film removing efficiency, the environmental safety and the treating capacity so that it can have excellent general-purpose properties and can contribute to the recycling of the coated resin products over a wide field.

According to the apparatus of the invention for peeling the coating films of the coated resin products, on the other hand, by neither employing chemicals such as organic salts or solvents nor requiring the secondary treatment such as the wastewater treatment, moreover, the coated resin products can be coarsely crushed, and the coarsely crushed products are conveyed while being rubbed by the cylinder and the rotary member to peel the coating films from the base resin material, thereby to improve the coating film removing efficiency, the environmental safety and the treating capacity. At the same time, the cylinder unit, the rotary member and drive unit, for example, can be constructed by utilizing the parts of the existing extrusion molding machine, for example, so that the coating film peeling apparatus can be provided simply at the low cost.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A coating film peeling apparatus for peeling a coating film from coarsely crushed products of a coated resin product having a base resin material coated the coating film; said apparatus comprising:
    a cylindrical member having a loading mouth on one end side thereof and an outlet on the other end side thereof;
    a rotary member disposed rotatably within the cylindrical member;
    a plurality of elliptical protrusions on an outer circumference of said rotary member, each elliptical protrusion having a substantial elliptical section as viewed in the axial direction of said rotary member; and
    a drive unit driving said rotary member rotationally, wherein the coarsely crushed products of the coated resin product are loaded into said cylindrical member from the loading mouth, and then conveyed and rubbed by a rotation of said rotary member.

2. The coating film peeling apparatus as set forth in claim 1, wherein major axes of adjoining elliptical protrusions are intersected.

3. The coating film peeling apparatus as set forth in claim 1, further comprising:
    a helical thread extending helically in an axial direction of said rotary member on the outer circumference of said rotary member.

4. The coating film peeling apparatus as set forth in claim 3, wherein a pitch of said helical thread is set to be the smaller the more downward in a conveying direction in which said coarsely crushed products are conveyed.

5. The coating film peeling apparatus as set forth in claim 3, wherein a diameter of said helical thread is set to be the larger the more downward in a conveying direction in which said coarsely crushed products are conveyed.

6. The coating film peeling apparatus as set forth in claim 3, wherein said helical thread and said elliptical protrusions are combined and arranged in plurality in the axial direction.

7. The coating film peeling apparatus as set forth in claim 1, wherein a pitch of said elliptical protrusion is set to be the smaller the more downward in a conveying direction in which said coarsely crushed products are conveyed.

8. The coating film peeling apparatus as set forth in claim 1, wherein a diameter of said elliptical protrusion is set to be the larger the more downward in a conveying direction in which said coarsely crushed products are conveyed.

9. The coating film peeling apparatus as set forth in claim 1, wherein said cylindrical member includes a first cylindrical portion and a second cylindrical portion which are formed in parallel in an axial direction of said rotary member while partially overlapping each other, and said rotary member includes a first rotary member disposed rotatably within the first cylindrical portion and a second rotary member disposed rotatably within the second cylindrical portion.

10. The coating film peeling apparatus as set forth in claim 1, further comprising:
    a heating unit for heating an inside of said cylindrical member.

11. The coating film peeling apparatus as set forth in claim 1, wherein said cylindrical member has an opening formed between the loading mouth and the outlet on said cylindrical member, the opening provided with a mesh for dropping a part of chips of the coating film peeled from said coarsely crushed products.

12. The coating film peeling apparatus as set forth in claim 1, wherein said cylindrical member includes a plurality of cylindrical elements removably joined to each other in an axial direction of said rotary member.

13. The coating film peeling apparatus as set forth in claim 1, wherein said cylindrical member has a roughened inner face.

14. The coating film peeling apparatus as set forth in claim 1, wherein said rotary member comprises a rotary shaft disposed rotatably within said cylindrical member, and a plurality of rotary member elements jointed integrally to the rotary shaft.

15. The coating film peeling apparatus as set forth in claim 14, wherein said rotary member elements include a first rotary member element provided with the plurality of elliptical protrusions, and a second rotary member element provided with a helical thread.

16. The coating film peeling apparatus as set forth in claim 14, wherein said rotary member elements include a first rotary member element provided with a plurality of elliptical protrusions having a first width and a first minor-axis length; and a second rotary member element provided with a plurality of elliptical protrusions having a second width and a second minor-axis length, at least one of the second width and the second minor-axis length of the second rotary member element being larger than that of the first rotary member element.

17. An apparatus for removing a film coated on a resin product formed of a base resin material comprising:
    a cylindrical member having a loading mouth at one end thereof and an outlet at an opposite end thereof,
    a rotary member disposed rotatably within said cylindrical member and having a first elliptical protrusion with a predetermined diameter formed on a portion of an outer periphery of said rotary member and a second elliptical protrusion with a different diameter formed on another portion of said outer periphery of said rotary member, and a drive unit for driving said rotary member rotationally, whereby coarsely crushed resin product is loaded into said cylindrical member from said loading mouth and the conveyed and rubbed by rotation of said rotary member to thereby separate said film from said resin product.

18. The apparatus according to claim 17, wherein:

said rotary member has alternately said first elliptical thread protrusion and said second elliptical protrusion on the outer periphery of said rotary member.

19. The apparatus according to claim 17, wherein:

said first and second elliptical protrusions are protrusions with a smaller thread pitch on a downstream end of said rotary member that of an upstream end thereof.

20. The apparatus according to claim 17, wherein:

said first and second elliptical protrusions are protrusions having a larger thread pitch on a downstream end of said rotary member than that of an upstream end thereof.

21. The apparatus according to claim 17, wherein:

said cylindrical member has a plurality of cylinder elements for inserting a first rotating element and a second rotating element therein respectively so as to effectively separate said film from said base resin material by rubbing a plurality of small pieces with said rotating elements.

22. The apparatus according to claim 17, further comprising:

heating means are provided in said cylindrical member for heating a plurality of small pieces so as to effectively separate said film from said base resin material.

23. The apparatus according to claim 17, further comprising:

meshing means are provided under said cylindrical member for screening a plurality of small pieces so as to effectively separate said film from said base resin material.

24. The apparatus according to claim 17, wherein:

said cylindrical member comprises a plurality of cylindrical elements for including said rotary member so as to effectively separate said film from said base resin material.

25. The apparatus according to claim 17, wherein:

said cylindrical member has a rough inner surface so as to effectively separate said film from said base resin material.

* * * * *